US00RE35791E

United States Patent [19]

Volz

[11] E Patent Number: Re. 35,791

[45] Reissued Date of Patent: May 12, 1998

[54] PRINTED SHEET WITH INTEGRALLY FORMED STAMPS

[75] Inventor: Richard J. Volz, Box 460, R.R. 1, Jermyn, Pa. 18433

[73] Assignee: Richard J. Volz, Jermyn, Pa.

[21] Appl. No.: 506,899

[22] Filed: Jul. 26, 1995

Related U.S. Patent Documents

Reissue of:

[64] Patent No.: 5,344,190
Issued: Sep. 6, 1994
Appl. No.: 38,454
Filed: Mar. 29, 1993

[51] Int. Cl.[6] ..... G09F 3/00

[52] U.S. Cl. ..... 283/71; 283/116; 283/56; 462/64

[58] Field of Search ..... 283/51, 56, 71, 283/81, 116; 462/64; 281/2, 3.1, 5

[56] References Cited

U.S. PATENT DOCUMENTS

| | | | |
|---|---|---|---|
| 522,037 | 6/1894 | Williams | 283/71 |
| 734,077 | 7/1903 | Mani et al. | 283/71 X |
| 2,018,984 | 10/1935 | Van Mackelenbergh . | |
| 2,074,821 | 3/1937 | Wissmann . | |
| 2,675,170 | 4/1954 | Sebesta | 283/71 X |
| 2,709,001 | 5/1955 | Stahl | 283/71 X |
| 4,011,985 | 3/1977 | Simson . | |
| 4,809,905 | 3/1989 | Goodman . | |

*Primary Examiner*—Willmon Fridie, Jr.
*Attorney, Agent, or Firm*—Bell Seltzer Intellectual Property Law Group of Alston & Bird LLP

[57] ABSTRACT

A combination printed sheet and stamps that may be a direct mailer or a book of stamps comprising a sheet of imprintable material of substantially uniform thickness and including a first or stamp portion and a second self-mailer or stamp book cover portion, an adhesive coating on one side of the sheet and printed indicia on the other side thereof. The second portion of the sheet is foldable along a medial fold line to position the two segments thereof into superposed relation and the adhesive coating is activatable to secure the segments together to provide the thickness and stiffness necessary for the second portion to serve as a self-mailer or as a stamp book cover.

18 Claims, 2 Drawing Sheets

PRINTED SHEET WITH INTEGRALLY FORMED STAMPS

Matter enclosed in heavy brackets [ ] appears in the original patent but forms no part of this reissue specification; matter printed in italics indicates the additions made by reissue.

FIELD OF THE INVENTION

This invention relates to the production of stamps and associated advertising or printed materials and more particularly to printed sheets having one portion thereof forming stamps and the other portion having advertising or other printed material.

BACKGROUND OF THE INVENTION

It is common practice in the marketing of products by mail to provide a sheet of stamps depicting the products which the consumer may wish to order from the manufacturer or supplier and an associated self-mailer. The consumer may remove one or more of the stamps from the sheet of stamps provided, adhesively secure the stamps to designated areas of the self-mailer to order the products depicted on the stamps selected and then return the self-mailer to the manufacturer or supplier through the United States mail. Currently, the most common self-mailer is a postal card to which the consumer may affix the selected stamps to order the products the consumer desires.

The United States Postal Service processes postal cards by automated mail-handling equipment and has certain minimum standards or specifications which such postal cards must meet. Among these standards and specifications are certain minimum thickness and stiffness specifications.

Because of these stiffness and thickness specifications for postal cards, it has heretofore not been possible to print the postal cards and stamps in an integrated, single printing operation. Heretofore, the sheet of stamps has been processed and printed separately from the postal cards which are produced from thicker and stiffer stock materials than are the stamps. These separate operations have necessarily increased the cost of manufacture and handling of the advertising and promotional materials and have employed significant manual operations.

The United States Postal Service currently sells postage stamps in various ways, perhaps the most common of which is in books of stamps. These books of stamps have relatively thick and stiff outer covers which bear printed indicia identifying and advertising the postage stamps confined within the outer cover. These covers and the postage stamps therein are produced in separate forming and printing operations. The relatively thick and stiff covers are printed in a separate operation from the postage stamps, are cut to appropriate size and then manually assembled with the independently printed, cut and folded stamps. Most commonly, the covers and stamps are stapled together.

With the foregoing in mind, it is an object of the present invention to produce a self-mailer or a book of stamps which is capable of being produced in a single printing and assembling operation and which therefore overcomes the disadvantages and deficiencies of prior self-mailers or stamp books.

It is a more specific object of the present invention to provide a self-mailer with integral stamps or a book of stamps formed of a single sheet of uniform thickness commonly used in the production of stamps.

SUMMARY OF THE INVENTION

The foregoing objects of this invention are accomplished by utilizing a single, integral sheet of paper, or other readily imprintable material, of uniform thickness corresponding to the thickness normally utilized in the manufacture of stamps. This sheet is coated on one side thereof with a suitable, normally inactive, but activatable, adhesive and the opposite side thereof is printed with predetermined indicia. A first portion of the paper sheet comprises the stamp portion and the other or second portion thereof comprises the self-mailer or stamp book cover portion thereof. The stamp portion is suitably perforated or scored in a longitudinal and transverse manner to divide the stamp portion of the sheet into individual stamps that may be removed by fracturing the material of the sheet along the lines of perforations. The self-mailing or stamp book cover portion of the sheet has a transverse fold line impressed therein and is printed on the different sections on opposite sides of the fold line with the printed indicia desired on the front and back of the self-mailer or stamp book cover portions.

Once printed, the self-mailer is folded along the fold line such that the two adhesive coated surfaces of the two sections are brought into contiguous relation and the adhesive is rendered active to adhesively secure the two portions of the self-mailer together. Once folded and adhesively secured together, the two sections of the self-mailer meet the thickness and stiffness specifications of the United States Postal Service for postal cards. The self-mailer portion with the stamps integral therewith may then be suitably mailed to prospective consumers for their use in ordering products.

In the stamp book embodiment, the cover portions are folded along a first suitable fold line to bring the adhesive surfaces into contiguous relation and the adhesive is activated to secure those portions together. The cover portions are then again folded along second fold lines to bring the cover portions into a U-shape. The stamp portion is folded such that the stamps are confined between the cover portions. The stamp book is thus completed without any additional securement of the stamps and cover to each other.

BRIEF DESCRIPTION OF THE DRAWINGS

Some of the objects and advantages of the present invention having been stated, others will appear as the description proceeds when considered in conjunction with the accompanying schematic drawings, in which.

DETAILED DESCRIPTION OF THE EMBODIMENTS

Figure 1:
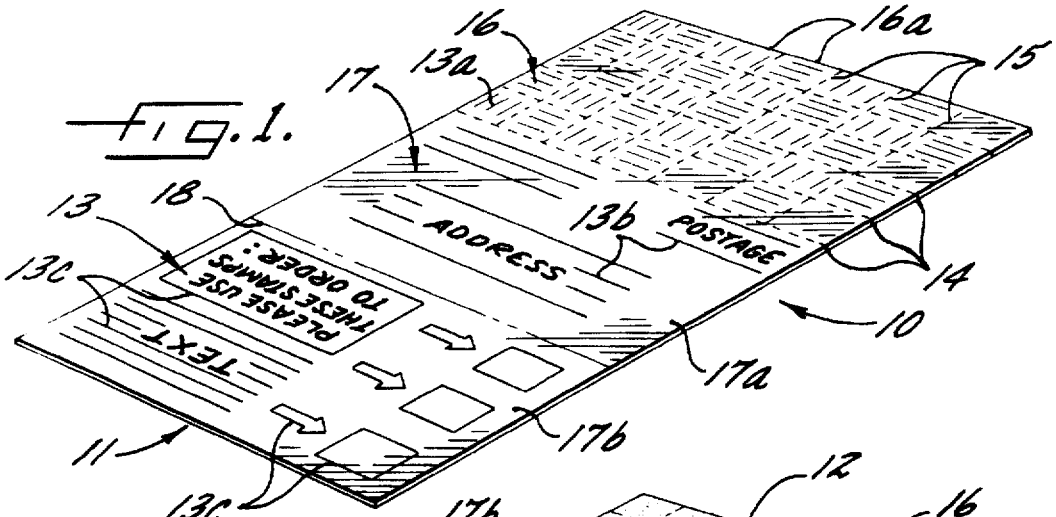
FIG. 1 is a perspective view of a sheet incorporating the features of the present invention.
Figure 2:
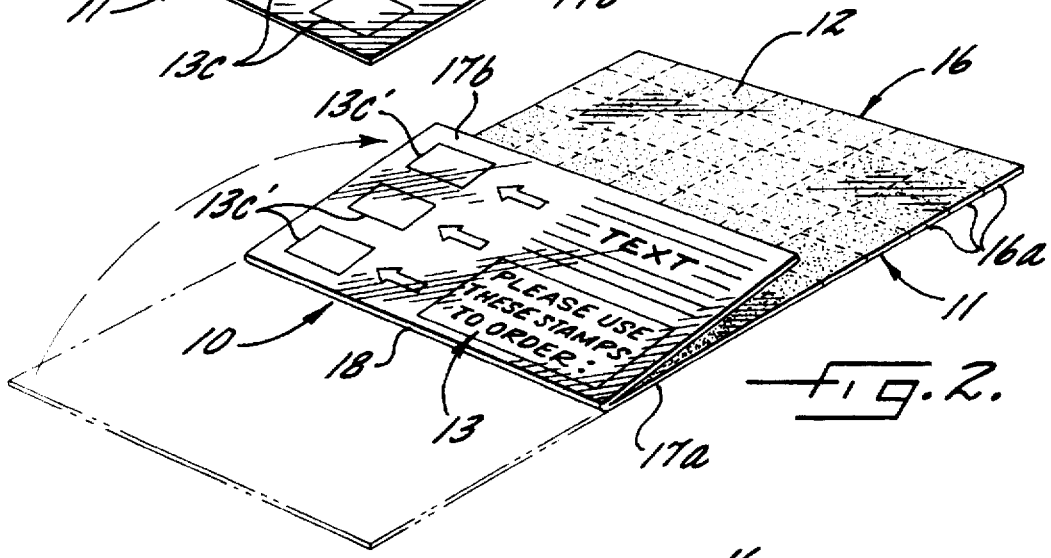
FIG. 2 is a perspective view of the sheet shown in FIG. 1 with the reverse side uppermost and illustrating the manner of folding the second portion thereof to form a self-mailer with integrally attached stamps.

Referring now, more particularly to the drawings and particularly to FIGS. 1–4 wherein a first embodiment of this invention is shown, a self-mailer with integrally formed stamps is generally indicated at 10. Self-mailer 10 comprises a sheet 11 of paper, or other readily imprintable material, having a substantially uniform thickness throughout. Preferably, sheet 11 is of paper material and has a thickness and stiffness normally employed in the production of postage stamps and the like.

A normally inactive adhesive coating 12 is placed on one side of the sheet 11 and preferably completely covers such one side of sheet 11. The adhesive may be of any desired composition which is normally dry and inactive, but which is activatable, as by wetting, when the stamps are desired to be affixed to the self-mailer or when the self-mailer portions are to be secured together. The adhesive that is normally used on postage stamps is an acceptable example for use with this invention. Other acceptable adhesives will be well known to persons skilled in the production of stamps.

The opposite side of sheet 11 is imprinted with printed indicia 13. The imprinted indicia 13 may be of any desired type and content as will be described more fully hereinafter.

Either before or after printing of the printed indicia 13 onto sheet 11, sheet 11 is passed through a suitable dye cutter to form rows of perforations or fracturable lines 14 and columns of perforations or fracturable lines 15 in a first, stamp portion 16 of sheet 11. The rows of fracturable lines 14 are substantially parallel as are the columns of lines 15. The rows and columns of fracturable lines 14 and 15 intersect and form individual stamps 16a in stamp portion 16 of the sheet 11. The remaining second portion 17 of sheet 11 constitutes the self-mailer or postal card portion of the self-mailer 10.

The individual stamps 16a have printed thereon printed indicia 13a suitable for stamps used in ordering products by mail. Preferably, the printed indicia 13a on the individual stamps 16a are different for each particular stamp and corresponds to products which the producer of the self-mailer 10 has available for purchase by prospective customers.

The second portion 17 of sheet 11 has a medial fold line 18 extending transversely thereacross. Preferably, fold line 18 is in the center of the postal card portion 17 to divide the postal card portion into two halves 17a and 17b.

Postal card portion 17 has printed thereon printed indicia 13 suitable for a self-mailer intended to be used with stamps to order products by mail. Postal card section 17a is preferably imprinted with indicia 13b which preferably include the address of the producer of the self-mailer 10, indicia that indicate where the postage stamp is to be placed and a series of lines indicating where the customer's return address should be placed. Postal card section 17b is preferably imprinted with indicia 13c which include at least one block or space imprinted thereon as an indication that the prospective customer should affix one or more of the individual stamps 16a in the imprinted blocks or spaces. Printed indicia 13c also preferably include printed text instructing the prospective customer on how to use the self-mailer.

In use, once the self-mailer 10 is formed and imprinted, the postal card sections 17a and 17b are folded along fold line 18 into superposed relation with the adhesive coatings 12 thereon in contiguous relation. The adhesive coating on postal card sections 17a and 17b is activated so that the two superposed sections 17a and 17b are secured together. When thus folded and adhesively secured together the combined postal card sections 17a and 17b meet all of the thickness and stiffness specifications for postal cards imposed by the United States Postal Service. The self-mailer may thus be processed by automated mail handling equipment.

Figure 3:
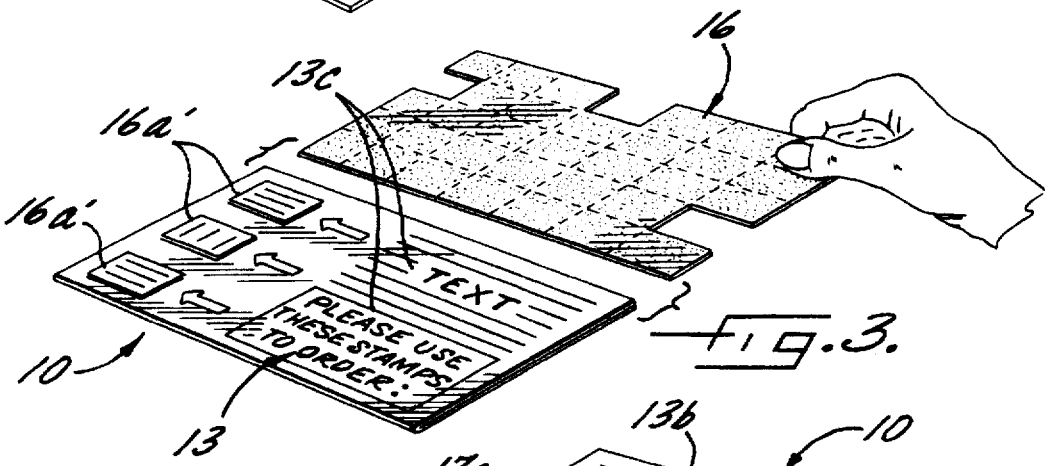
FIG. 3 is a perspective view of the self-mailer shown in FIG. 2 illustrating the manner of removing particular individual stamps and affixing them to the self-mailer and then removing the stamp portion of the sheet therefrom.
Figure 4:
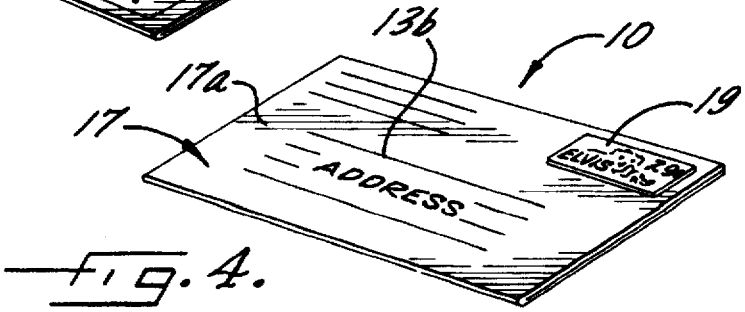
FIG. 4 is a perspective view of the reverse side of the completed mailer illustrating a postage stamp affixed thereto such that the self-mailer is ready for mailing.

When the customer desires to use the self-mailer 10, the customer removes one or more of the individual stamps 16a and affixes the same to the imprinted spaces 13c on the postal card section 17b. The customer then removes the remaining stamps 16a of stamp portion 16 by fracturing the paper material along the row of perforations 14 forming the dividing line between the stamp portion 16 and the postal card portion 17 as is illustrated in FIG. 3. Finally, the customer affixes a postage stamp 19 to the postal card section 17a, writes in the customer's return address and deposits the completed self-mailer 10 in the United States Postal Service.

Referring now to FIGS. 5–9 in which another embodiment of the present invention is shown, there is illustrated a stamp book generally indicated at 30 formed of a sheet 31 of suitable material, preferably paper, that is readily imprintable and is of substantially uniform thickness throughout. The sheet 31 has an adhesive coating 32 on one side thereof that preferably covers the entire surface of that side of sheet 31.

A first portion 33 of sheet 31 has a plurality of parallel rows 34 of fracturable lines of perforations or other indentations formed in the paper and a plurality of columns 35 of fracturable lines which intersect the rows 34 of perforations to divide portion 33 into a plurality of individual stamps 33a.

Preferably, the second or remaining portion 36 of sheet 31 has a first medial fold line 37 extending transversely thereacross to divide the portion 36 into two substantial halves 36a and 36b. Half 36a of second portion 36 has a second medial fold line 38 extending transversely thereacross and half 36b has a third medial fold line 39 thereacross.

The reverse side of sheet 31 has suitable printed indicia 40 thereon. The printed indicia 40a on the stamp portion 33 constitutes indicia normally employed in the printing of postage stamps. The printed indicia 40a on the individual stamps 33a may be identical for all of the individual stamps or some of the stamps 33a may be imprinted with indicia 40a that are the same while others are printed with indicia that are different. In some instances, it will be desirable to print different indicia on each of the stamps The cover portion 36 of sheet 31 is also imprinted with suitable indicia 40b that are commonly employed on the covers of books of postage stamps.

Figures 5, 6, 7, 8, 9:
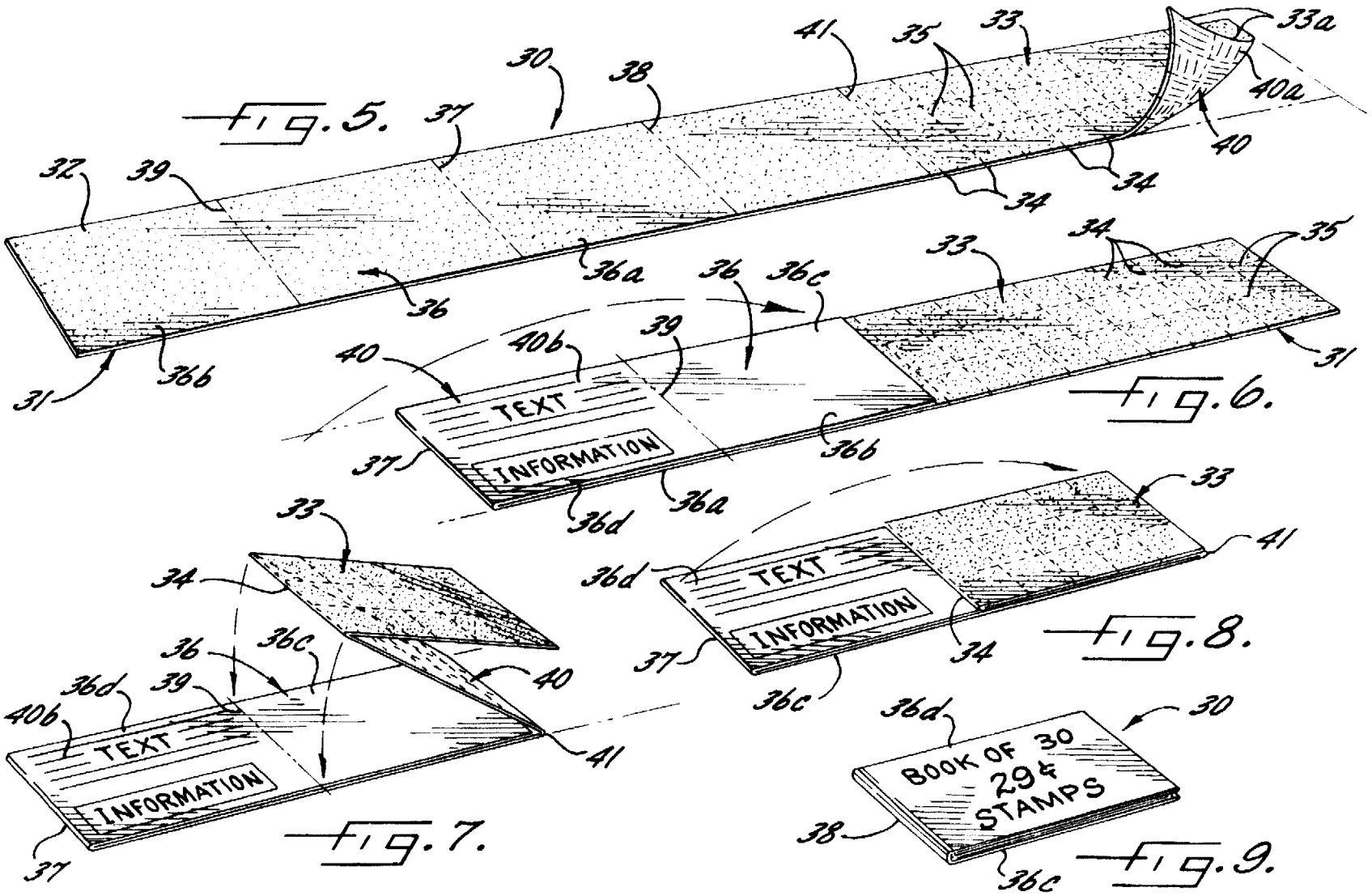
FIG. 5 is a perspective view of another embodiment of the sheet of this invention.
FIG. 6 is a perspective view of the sheet shown in FIG. 5 with the second portion folded to form the cover portion of a stamp book.
FIG. 7 is a perspective view of the stamp book shown in FIG. 6 illustrating the manner of folding the stamp portion thereof to position the folded stamps within the cover portion.
FIG. 8 is a view of the stamp book shown in FIG. 7 illustrating the manner of folding of the cover portion to enclose the stamps therein.
FIG. 9 is a perspective view of a completed stamp book in accordance with this invention.

Once the sheet 31 is formed and imprinted, the cover portion 36 is folded along fold line 37 to bring the cover halves 36a and 36b into superposed relation. The adhesive coating 32 thereon is activated to adhesively secure the cover halves 36a and 36b together (FIG. 6). The secured together cover halves 36a and 36b have the second and third fold lines 38 and 39 in superposition to divide the cover portion 36 into a bottom cover portion 36c and a top cover portion 36d.

The juncture between the stamp portion 33 and the cover portion 36 is defined by another fold line 41 such that the stamp portion 33 may be folded back into superposed relation to the bottom cover portion 36c along fold line 41. As the stamp portion 33 is being folded along fold line 41 into such superposed relation to bottom cover portion 36c, the stamp portion 33 is folded along the medial row 34 of perforations to bring the printed side of the stamps 33c into contiguous relation and the two halves of the stamp portion 33 into superposed relation. The cover portions 36c and 36d are then folded along superposed fold lines 38 and 39 to bring the top cover portion 36d into superposed relation to the folded stamp portion 33 and the back cover portion 36c as is illustrated in FIG. 8. The stamp book 30 is thus completed.

In the drawings and specifications, there has been set forth a preferred embodiment of the invention, and although specific terms are employed, they are used in a generic and descriptive sense only and not for purposes of limitation.

That which is claimed is:

1. A combination printed sheet and stamps comprising a sheet of readily imprintable material having a substantially uniform thickness and including a first portion and a second portion integral with said first portion, said first portion having rows and columns of fracturable lines extending longitudinally and transversely thereof to define a plurality of interconnected but removable stamps, said second portion having at least one medial fold line extending transversely thereof dividing said second portion into first and second segments, an adhesive coating on one side of said sheet, said adhesive coating being normally inactive, but being activatable when desired, and printed indicia on the other side of said sheet on said first and second portions thereof, whereby said sheet may be folded along said fold line to position said first and second segments thereof in superposed relation and, with the adhesive coated side thereof contiguous, the contiguous adhesive coating being activatable to secure said first and second segments together.

2. A combination printed sheet and stamps according to claim 1 wherein said second portion of said sheet is folded along said fold line to bring said adhesive coating on said first and second segments thereof into contiguous, superposed relation, and said adhesive coating on said second portion is activated to adhesively secure said first and second segments together.

3. A combination printed sheet and stamps according to claim 2 wherein said first and second segments of said second portion define opposite sides of a self-mailer having a combined thickness and stiffness corresponding to specifications for postal cards processable by automated mail handling equipment.

4. A combination printed sheet and stamps according to claim 3 wherein said printed indicia on one of said first arid second segments comprise the mailing address of the person sending the self-mailer to a prospective customer and said printed indicia on said other of said first and second segments include at least one printed area adapted to locate and receive an individual stamp removed from said first portion.

5. A combination printed sheet and stamps according to claim 4 wherein said printed indicia on said other of said first and second segments include a plurality of printed areas adapted to receive a plurality of individual stamps removed from said first portion.

6. A combination printed sheet and stamps according to claim 1 wherein said printed indicia on said first portion are different on each of the individual stamps.

7. A combination printed sheet and stamps according to claim 6 wherein said printed indicia on said individual stamps identify different products a prospective customer may wish to order.

8. A combination printed sheet and stamps according to claim 2 wherein said first and second segments of said second portion have a second medial fold line extending transversely thereof to divide the adhesively secured together first and second segments into front and back covers of a stamp book.

9. A combination printed sheet and stamps according to claim 8 wherein said first portion is folded along a medial fracturable transverse line such that the surfaces having said printed indicia thereon are placed in contiguous, superposed relation.

10. A combination printed sheet and stamps according to claim 9 wherein said first portion is further folded along a fold line between said first and second portions such that said first portion is in superposed relation to the back cover portion of said second portion and underneath the front cover portion of said second portion.

11. A combination printed sheet and stamps according to claim 1 wherein said printed indicia on said first portion comprise postage stamp indicia.

12. A combination printed sheet and stamps according to claim 11 wherein said postage stamp indicia are printed on each of said stamps of said first portion.

13. A combination printed sheet and stamps according to claim 11 wherein said postage stamp indicia on at least some of said stamps are the same.

14. A combination printed sheet and stamps according to claim 13 wherein said postage stamp indicia on each of said stamps are the same.

15. A combination printed sheet and stamps according to claim 11 wherein said postage stamp indicia on some of said stamps are the same and on the remaining stamps are different.

16. A combination printed sheet and stamps according to claim 11 wherein said postage stamp indicia on each of said stamps are different.

17. A combination printed sheet and stamps according to claim 10 wherein said printed indicia on said second portion identify the postage stamps folded therein.

*18. A combination printed sheet and stamps comprising*

*a sheet of readily imprintable material having a substantially uniform thickness and including a first portion and a second portion, said first portion having fracturable lines dividing said first portion into interconnected but removable stamps, said second portion having at least one medial fold line extending transversely thereof dividing said second portion into first and second segments,*

*printed indicia on one side of said first portion between the fracturable lines to produce stamp information thereon,*

*printed indicia on one side of said second portion to produce cover information thereon,*

*a first adhesive coating on the other side of said first portion to provide for attachment of the stamps to a surface,*

*a second adhesive coating on the other side of said second portion for securing said first and second segments together when said second portion is folded about said fold line, and*

*whereby said second portion may be folded along said fold line to position said first and second segments thereof in superposed relation and with the adhesive coated sides thereof contiguous, the adhesive coating being activatable to secure said first and second segments together.*

* * * * *